United States Patent
Kernahan (10) Patent No.: US 9,668,434 B2
(45) Date of Patent: Jun. 6, 2017

(54) ROOT MISTING SYSTEM

(71) Applicant: Assense Technology Hong Kong Limited

(72) Inventor: Kent Kernahan, Cupertino, CA (US)

(73) Assignee: AESsense Technology Hong Kong Ltd., Harbour (HK)

(*) Notice: Subject to any disclaimer, the term of this patent is extended or adjusted under 35 U.S.C. 154(b) by 171 days.

(21) Appl. No.: 14/339,015

(22) Filed: Jul. 23, 2014

(65) Prior Publication Data

US 2016/0021837 A1 Jan. 28, 2016

(51) Int. Cl.
*A01G 31/00* (2006.01)
*A01G 31/02* (2006.01)

(52) U.S. Cl.
CPC ............ *A01G 31/02* (2013.01); *Y02P 60/216* (2015.11)

(58) Field of Classification Search
CPC ................................. A01G 31/00; A01G 31/02
USPC ........................................................ 47/62 A
See application file for complete search history.

(56) References Cited

U.S. PATENT DOCUMENTS

| 5,937,575 A * | 8/1999 | Zobel ..................... A01G 31/02 250/339.13 |
| 7,472,513 B2 * | 1/2009 | Bula ........................ A01G 9/16 47/58.1 LS |
| 8,904,705 B2 * | 12/2014 | Downs, Sr. ............ A01G 31/02 47/62 A |
| 2002/0137085 A1 * | 9/2002 | Herrick ................ B01J 19/0046 435/6.12 |
| 2003/0051886 A1 | 3/2003 | Adiga et al. |
| 2008/0005962 A1 | 1/2008 | Hashimoto et al. |
| 2009/0293357 A1 | 12/2009 | Vickers et al. |
| 2012/0005957 A1 | 1/2012 | Downs, Sr. |
| 2012/0279126 A1 * | 11/2012 | Simmons ............... A01G 31/02 47/62 A |
| 2013/0255152 A1 * | 10/2013 | Johnson ................. A01G 31/06 47/62 C |
| 2014/0259916 A1 * | 9/2014 | Janney ................... A01G 31/02 47/66.6 |
| 2015/0082699 A1 * | 3/2015 | Wu ........................ A01G 31/02 47/62 A |
| 2015/0313104 A1 * | 11/2015 | Cottrell .................. A01G 1/001 47/62 A |

* cited by examiner

*Primary Examiner* — Monica Williams
*Assistant Examiner* — Aaron Rodziwicz
(74) *Attorney, Agent, or Firm* — David T. Millers (57) ABSTRACT

A system for providing water to the roots of a plant being grown in an aeroponic growth system includes small reservoirs containing water and a mist generator, wherein the mist generator provides mist under low pressure to a channel which directs the mist to the roots of the plant.

13 Claims, 7 Drawing Sheets

FIG. 5
SECTION A-A

FIG. 6

FIG. 7

ROOT MISTING SYSTEM

BACKGROUND

Aeroponics is the technique of growing plants by providing droplets of water, and possibly water with nutrients, to plant roots, wherein the droplets are smaller than the pore size of the roots.

Water, and nutrient enriched water, are absorbed by a plant's roots, wherein the pores of a given root typically average around 50 microns in diameter, down to about 5 microns. Thus a droplet of 50 microns or less may fit inside a root pore and be attracted into the pore by a van de Waals force without requiring additional energy from the plant.

An aeroponic growth system generally comprises a system for delivery of nutrient rich water to one or more plants, wherein the plant roots are exposed to a nutrient-rich water mist comprising droplets of an appropriate size. The system may be outdoors, in a green house, or within a facility that includes provision of light for plant growth. The water may be reclaimed as it condenses and recirculated or it may be discharged.

Aeroponic growth systems implement a variety of means for providing water and nutrients to plant roots. In one example, a mist of droplets may be created by a high pressure pump providing water through a very small orifice, thus creating the droplets. The discharge orifices are generally in the vicinity of the roots within a growth chamber, intended to fill the growth cavity with a mist. Droplets so produced usually have a high average droplet size, thus are not efficiently absorbed by the roots. Accordingly more droplets must be provided and more power expended in pumping.

In other systems one or more atomizers may be placed in a reservoir. The reservoir may be located adjacent to a growth chamber. The atomizers produce a range of droplets in a mist, which are gently moved from the reservoir to the growth chamber by a fan at the upper end of the reservoir. Droplets that are light enough to be blown into the growth chamber are generally the very small ones. Though such droplets are more readily absorbed by the roots, the quantity of water or nutrients delivered per unit of time is low. Thus, the challenge is in getting enough water into the root area. The rate of delivery, noise, and the power required are problematic.

Figure 1:
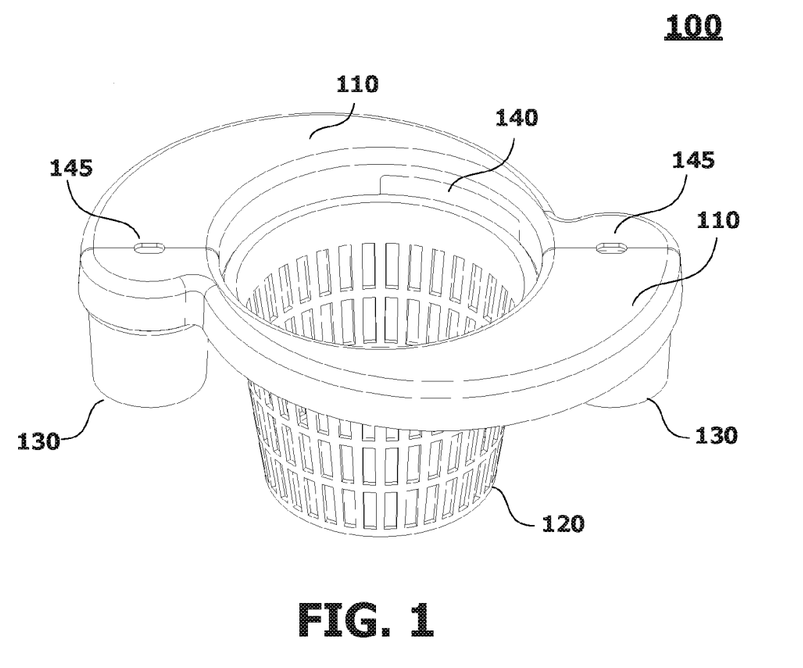
Figure 2:
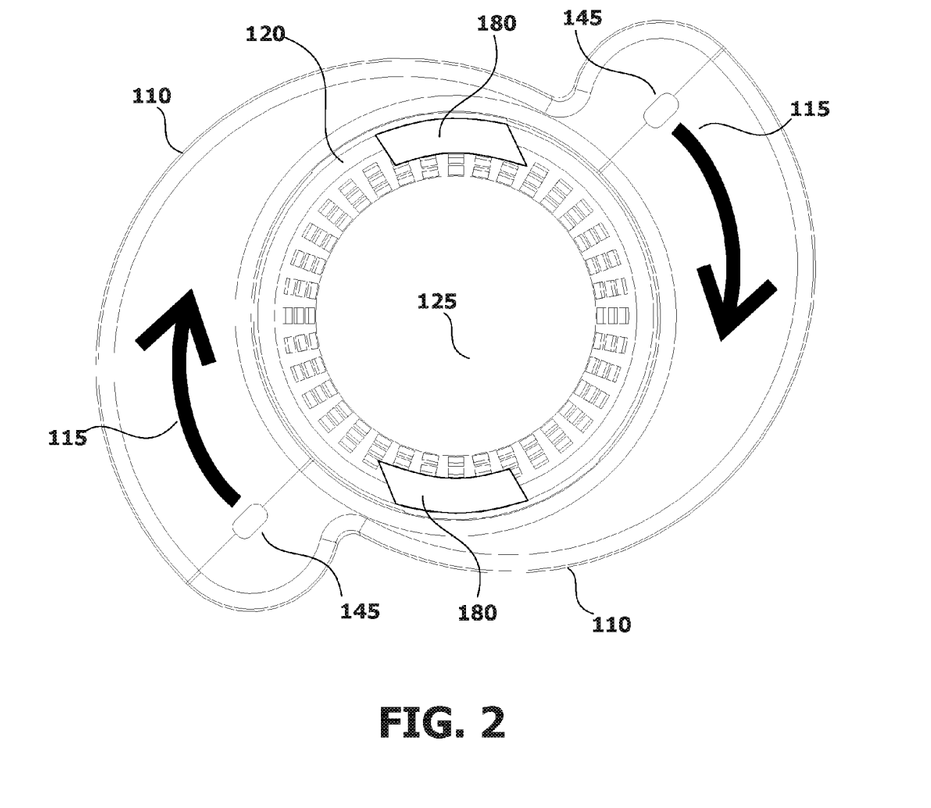

What is needed is a system for making a high yield of droplets below 50 microns in diameter wherein the entire yield of droplets is made available to the root system in an aeroponic growth system.

SUMMARY

According to one embodiment of the invention disclosed hereinafter, a mist-generator is placed into a small reservoir of nutrient-rich water near the plant roots, wherein the reservoir is approximately at the same vertical level as the top of the plant roots. The mist generator is selected for its providing droplets of approximately 50 microns or less, which is delivered as a fog-like mist that is entrained down a horizontal channel, exiting approximately at the juncture of the plant foliage and the plant roots. The fog falls over the roots, and by virtue of nearly all droplets being of the correct size the droplets are efficiently absorbed by the root pores.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 1 shows one embodiment of the structure of a plant root misting system.

FIG. 2 is a top view of a plant root misting system.

FIG. 3 is a side view of a plant root misting system.

FIG. 4 is a perspective view of a base of a plant root misting system.

FIG. 5 is a baffle device within a misting tube chamber. is a system diagram of a system for distributing nutrient-enriched water to a misting system.

FIG. 6. is a system diagram of a system for distributing nutrient-enriched water to a misting system.

FIG. 7 is a representative aeroponic growth system enclosure, including misting systems and mist baffle chambers.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In the description herein the singular may apply to the plural and the plural may apply to the singular.

Looking to FIG. 1, a plant root misting system 100 comprises an upper portion 110 of a shell and a base 132 (FIG. 4). The upper portion 110 of the shell may be split into two halves (as viewed from above), thereby allowing the upper portion 110 to be removed from the base without disturbing a plant which may be growing within the opening for plant growth. In some embodiments the halves are a unitary piece.

In some embodiments a basket 120 (sometimes denominated as a "net pot") is a plastic piece with holes for allowing the roots to extend downward into the cavity of a reservoir 710 (FIG. 7). The basket 120 may also be a wire basket of any material or any other construction suitable for holding a plant at the top surface 160 of an aeroponic growth enclosure (See FIG. 7). A water reservoir 130 in each shell half 110 holds a quantity of water or nutrient enriched water. The reservoirs 130 may from time to time be replenished by a circulating water distribution system as detailed hereinafter and by FIG. 6. The basket 120 may be constructed with a solid bottom 125 as shown in FIG. 2 or the bottom may also include openings. When a plant sprout or seed is put into the basket a medium such as hydroton, rockwood, or some other suitable support means may be used until the plant is strong enough to stand without the support.

Each reservoir 130 may be provided with a mist generator 165. The mist generator may be one of a number of types. For example, in some embodiments a high pressure supply to a small orifice is used. In such a configuration the orifice may face upwards and the high pressure water provided from underneath the reservoir 130. In another embodiment a piezoelectric transducer, or ultrasonic transducer, maybe submerged under the water in the reservoir 130. In another example, a transducer may be driven by a high frequency, such as 1.7 MHz, electrical signal to produce a mist of droplets of the desired range of sizes. In one embodiment a 19 watt transducer with a 20 mm transducer disc is used.

Looking down on the shell 110 in FIG. 2, note that the fog rises up from the reservoir 130 when generated by the mist generator 165, then is entrained along the channel in the direction shown 115 until exiting the shell 110 channel via an opening 140. When a plant is present in the basket 120 the mist may tend to somewhat swirl as it spills out of the opening 140 and descends into the basket 120, thereby covering the root area more efficiently. The channel being tangential to the rim of the basket 120 encourages the mist swirl. In some embodiments only a single water reservoir 130 and mist generator 165 are used. Using two reservoirs and two mist generators may provide for a more uniform application of mist to the roots of the plant. Using two or more mist generators 165 allows for continued mist delivery when an individual mist generator 165 fails, thereby overcoming the risk of crop failure. In some embodiments the reservoirs 130 are a minimum height of 40 mm from the floor of the reservoirs 130 to the base unit 132.

FIG. 2 also shows an optional ramp 180 wherein the ramp 180 begins at the floor of the exit opening 140 and generally extends in the direction of the swirling mist flow 115 and is over the upper edge of the basket 120. The ramp 180 may be attached after assembly of the rest of the mist generator 100 and the basket is in position. The ramp 180 is not shown in the other figures.

Figure 4:
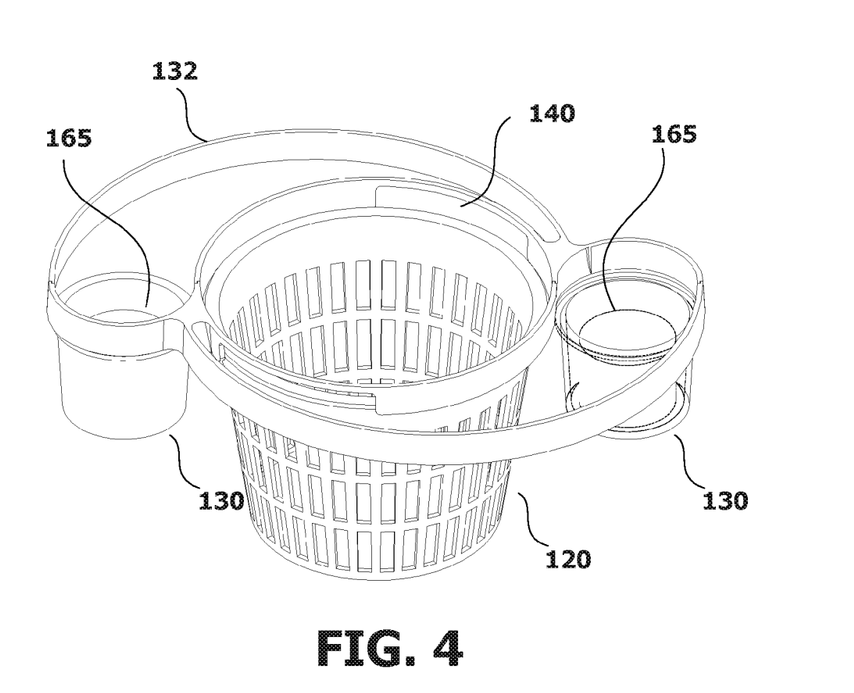

FIG. 4 is a detailed view of the base 132. The transducers 165 may be seen, one shown in a semi-transparent reservoir 130 for clarity. Wires providing the signals driving the transducers (not shown) may be routed to the transducers 165 through small holes 145 in the top of the shell 110 (FIG. 1). The holes may be located approximately over the transducers 165. In some embodiments the wires are provided with quick disconnect electrical terminals to facilitate easy installation and removal.

Figure 7:
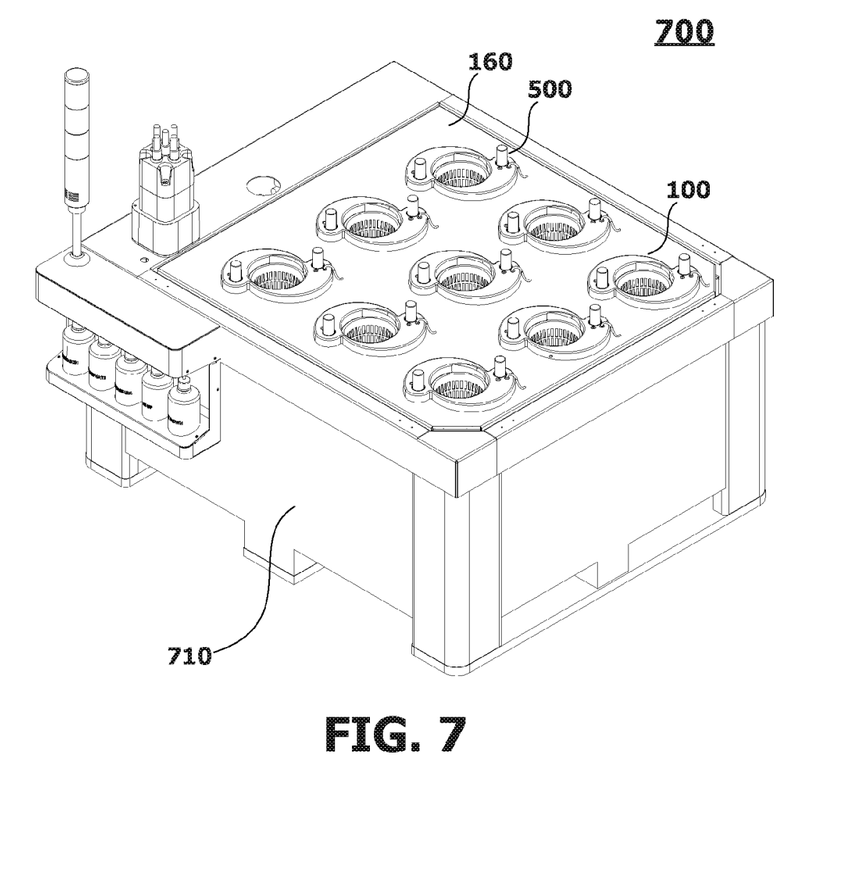

The base 132 may be permanently affixed to the top 710 of the aeroponic growth system, or simply lay upon it. In one embodiment the base is a molded part of the top 710.

Figure 3:
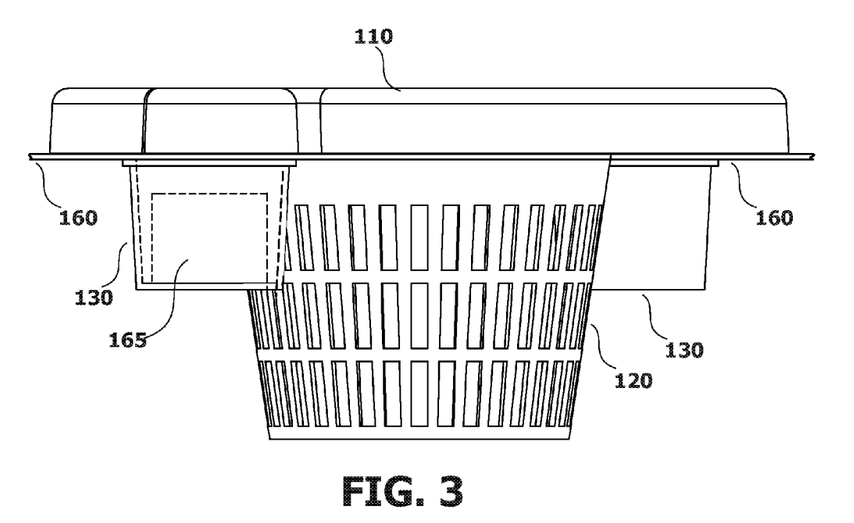
Figure 5:
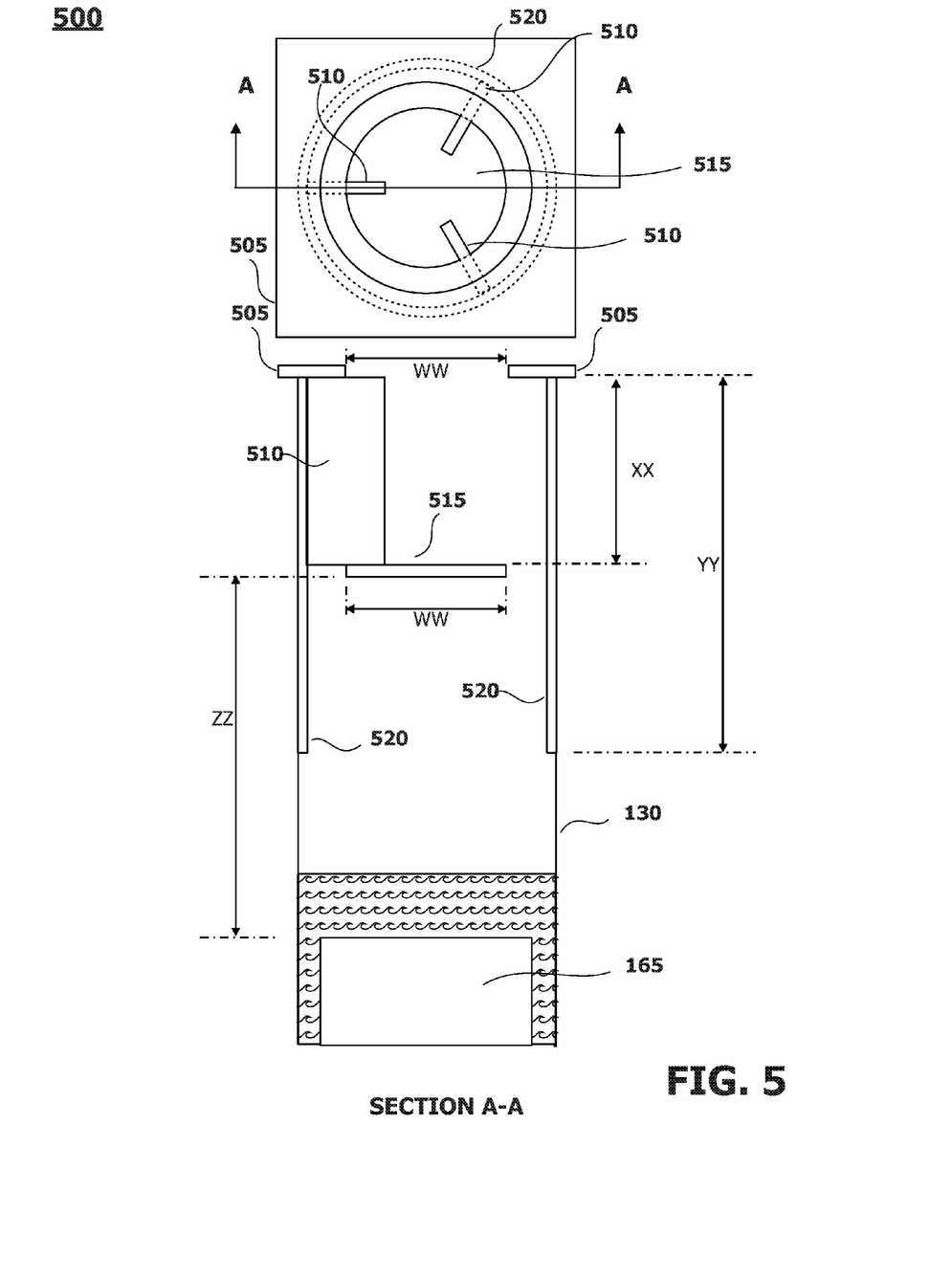

In some embodiments, generally depending upon the mist generating technology, power, and physical size, the mist generator may cause water to splash up on the base. Likewise there may be an advantage of droplet yield, defined as that portion of droplets generated that are within the desired diameter range, to provide a chamber with a baffle which extends above the top surface of the upper shell 110. Such a chamber 500 is not shown in FIG. 1, FIG. 2, or FIG. 3 but is detailed in FIG. 5 and is shown as-installed in FIG. 7. The chamber and baffle provide for containing the water and mist while also allowing air into the assembly 100. An example of a chamber and baffle is shown in FIG. 5, comprising a chamber 520 extending down into the reservoir 130; a baffle 515 held in place by one or more risers 510 which also connect to a top 505. The exact dimensions may depend upon the mist generator power and size. For example, for a 19 watt transducer with a transducer diameter of 45 mm a chamber may have an approximately 51 mm (2") inside diameter, providing clearance for water to flow around the sides of the transducer disc. Other dimensions may be:

XX: 40 mm
YY: 80 mm
ZZ: 77 mm

Figure 6:
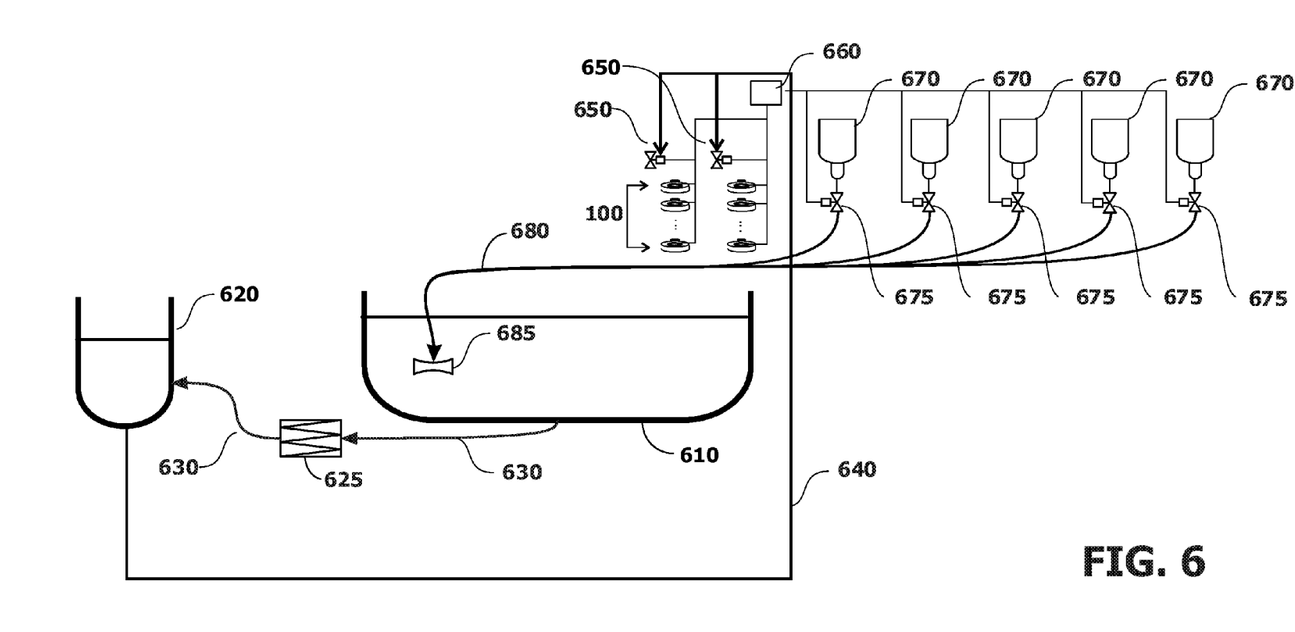

FIG. 6 illustrates one embodiment for distributing water with or without nutrients within an aeroponic growth system. An aeroponic growth system includes a reservoir 610 for holding water which may or may not have had nutrients added to the water. Nutrient canisters 670 with valves and one way check valves 675 dispense nutrients, for example, nitrogen gel, acid or base to control pH, or any other liquid or viscous material that is desired, into the reservoir via discharge tubing 680. In some embodiments the tubing 680 is connected to a venturi 685 such that the nutrients are introduced under low pressure and mixed with the water being used to refill the reservoir 610 by a different system, not discussed herein. In some embodiments the water and nutrients are collected as they drip down from the misters 100 into the reservoir. In other embodiments the water falling through the roots is collected for reclamation treatment or simply discarded. Water from the reservoir 610 may be provided to an optional tank 620 via tubing 630 which may include an optional filter 625. The water and nutrient mixture may be pulled on demand by pumps 650 for the misters 100 through tubing 640. In some embodiments the tubing 640 is two tubes, each dedicated to a bank of misters 100. A controller 660 may command the pumps to run to fill each small reservoir 130 as needed. The controller also provides drive signals, for example a 1.7 MHz signal, to the transducers 165. Some water may condense around the roots of the plants and fall back into the reservoir 610. In some embodiments the 1.7 MHz signal is set to provide signals ON/OFF to a duty cycle, for example two minutes ON then fifteen minutes OFF. The user may determine a different duty cycle, depending upon the plants being grown.

The pump 650 may be any pump providing adequate water volume delivery. For example, consider an aeroponic growth system 700 with nine baskets 120 and nine misting systems 100 (not shown in FIG. 7). In one embodiment small diameter tubes, for example 0.250", carry water from the optional tank 620 to the misters 100. The tubes may be rigid or flexible. Sometimes the tubes are transparent to allow visual inspection. A given mister reservoir 130 may have a single tube providing it water, each tube having a pressure regulating dripper on the end, rated for 0.5 gallons of water per hour. A single pump would then need to be rated to provide 4.5 gal/hr if it needed to pump full time. For a two pump system, each would need to provide at least 2.25 gal/hr. But the pumps may not be required to pump all the time, depending upon the mist output water volume and the duty cycle of the misters. A mist generator 165 generally uses 400 ml/hr of water, or roughly 0.1 gal/hr. Eighteen mist generators would require a total of 1.8 gal/hr. Thus a single pump system would have approximately an 80% duty cycle, or a two pump system a 40% duty cycle.

In another embodiment the regulated drippers are configured as a manifold located near the pump(s), then open ended tubes 640 are routed to each reservoir 130.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

I claim:

1. A system for providing a mist to roots of a plant, comprising: a base unit including a first reservoir and a second reservoir; a top unit atop the base unit, thereby forming, a first channel and a second channel for directing flows of mist towards roots of a plant; a first mist generator in the first reservoir and having an output disposed to provide mist to the first channel; a second mist generator in the second reservoir and disposed to provide mist to the second channel; and a controller electrically connected to the first and second mist generators, wherein the controller provides an electrical signal to the first and second mist generators causing the first and second mist generators to generate mist; and a main reservoir positioned to collect liquid falling from the roots of the plant; and a pump system connected to pump liquid from the main reservoir to the first and second reservoirs.

2. The system of claim 1, further comprising:
a third mist generator in a third reservoir in the base unit; and
a fourth mist generator in a fourth reservoir in the base unit.

3. The system of claim 1, wherein each of the first and second mist generators is a transducer driven by an electrical signal.

4. The system of claim 3, wherein the signal is a 1.7 Mhz signal.

5. The system of claim 1, wherein each of the first and second reservoirs holds a liquid mixture of water and plant nutrients.

6. The system of claim 1, further comprising a baffle and a chamber extending down into the first reservoir and up above the top unit, wherein the baffle and the chamber allows air into the first reservoir and prevents escape of liquid that the first mist generator splashes.

7. The system of claim 1, further comprising
a plurality of canisters; and
a dispensing system connected to the canisters and dispensing plant nutrients from the canisters to the main reservoir.

8. A system comprising:
a holder configured to hold a root system;
a base unit surrounding the holder and including a first reservoir and a second reservoir;
a top unit atop the base unit, the top unit including an opening through which a plant extends when the holder holds the root system of the plant;
a first mist generator in the first reservoir; and
a second mist generator in the second reservoir, wherein:
the base unit and the top unit are shaped to define a first channel that directs mist from the first mist generator to the holder and define a second channel that directs mist from the first mist generator to the holder.

9. The system of claim 8, wherein the first channel and the second channel are tangential to a perimeter of the holder.

10. The system of claim 8, wherein the top unit comprises a two-piece shell including two halves shaped to be removed from the base unit without disturbing a plant within the opening.

11. The system of claim 8, further comprising a first ramp that begins at the floor of the exit opening and generally extends in the direction of the swirling mist flow and is over the upper edge of the basket.

12. The system of claim 8, further comprising:
a main reservoir positioned to collect liquid falling from the holder; and
a pump system connected to pump liquid from the main reservoir to the first reservoir and the second reservoir.

13. The system of claim 12, further comprising
a plurality of canisters; and
a dispensing system connected to the canisters and dispensing plant nutrients from the canisters to the main reservoir.

* * * * *